United States Patent [19]

Ku

[11] Patent Number: 4,559,583
[45] Date of Patent: Dec. 17, 1985

[54] GREETING CARD WITH BLINKING LIGHT APPARATUS

[75] Inventor: Ming-ho Ku, Kowloon, Hong Kong

[73] Assignee: Tradebest International Corporation, Los Angeles, Calif.

[21] Appl. No.: 594,209

[22] Filed: Mar. 28, 1984

[51] Int. Cl.⁴ .............................................. F21V 7/04
[52] U.S. Cl. ...................................... 362/32; 362/806; 362/295; 362/190; 40/124.2; 40/124.4; 229/92.8
[58] Field of Search .............. 362/32, 252, 800, 806, 362/190, 295; 40/124.1, 124.4; 229/92.8

[56] References Cited

U.S. PATENT DOCUMENTS

| | | | |
|---|---|---|---|
| 3,497,981 | 3/1970 | Tyne | 362/32 X |
| 4,209,824 | 6/1980 | Kaufman | 362/806 X |
| 4,234,907 | 11/1980 | Daniel | 362/32 |
| 4,236,191 | 11/1980 | Martinez | 362/32 |
| 4,286,399 | 9/1981 | Funahashi et al. | 40/124.1 |
| 4,344,110 | 8/1982 | Ruediger | 362/32 |
| 4,363,081 | 12/1982 | Wilbur | 362/806 X |
| 4,404,764 | 9/1983 | Wills et al. | 229/92.8 X |
| 4,411,490 | 10/1983 | Daniel | 362/32 X |

FOREIGN PATENT DOCUMENTS 1404375 8/1975 United Kingdom ................... 362/32

OTHER PUBLICATIONS

Eska Sign brochure, Mitsubishi Rayon Co., Japan, 1983.
Mitsubishi Rayon Company brochure.

Primary Examiner—Peter A. Nelson
Attorney, Agent, or Firm—David N. Makous

[57] ABSTRACT

A light reflection and blinking light apparatus comprising a light emitter, a means for regulating the transmission of light from the light emitter, and a length of fiber optic in communication with the light emitter incorporating a means for reflecting the light transmitted within the fiber optic to the outside at a specified location, and method for using the same.

1 Claim, 8 Drawing Figures

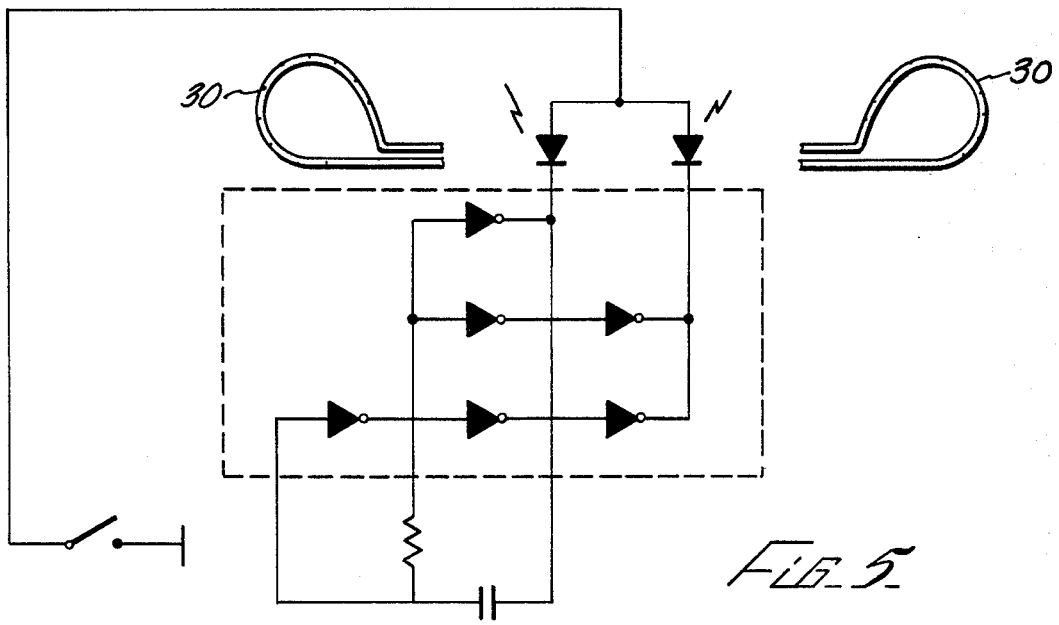
FIG. 5
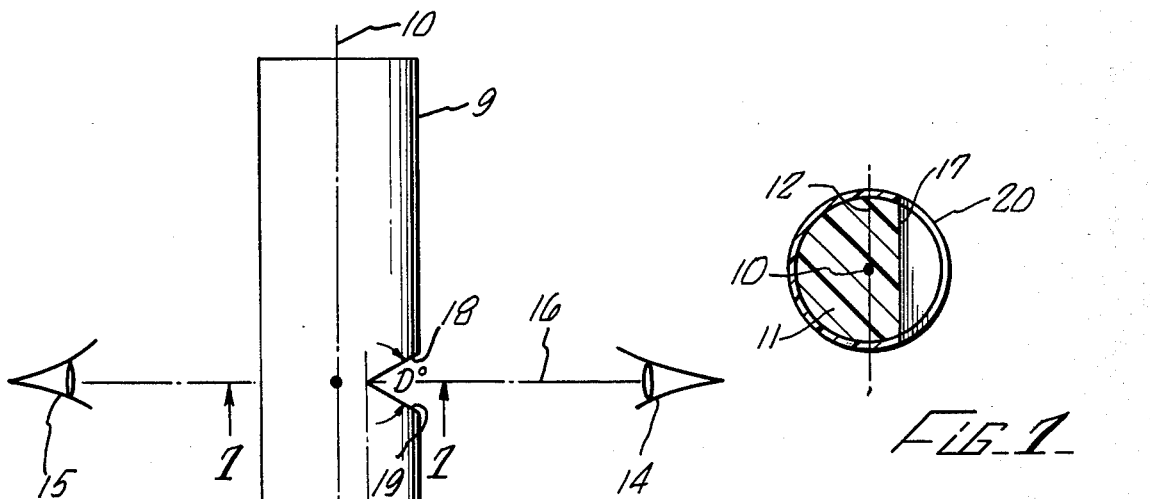
FIG. 7
FIG. 6
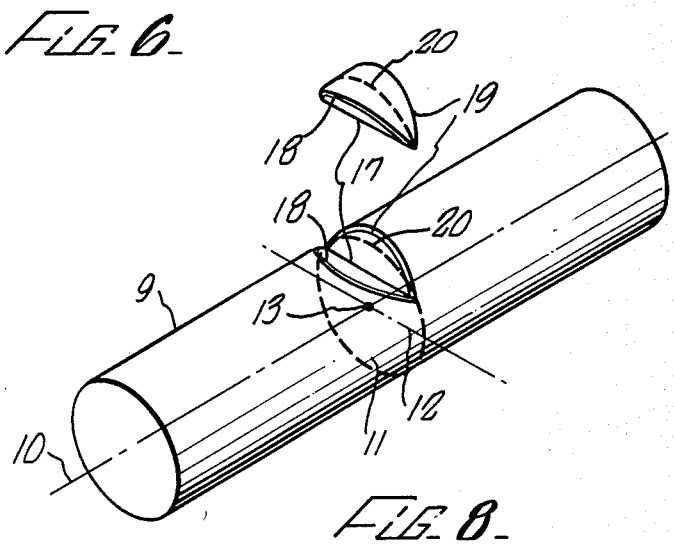
FIG. 8

GREETING CARD WITH BLINKING LIGHT APPARATUS

BACKGROUND OF THE INVENTION

The present invention relates generally to a light reflection and blinking apparatus and the method for the use of same. It is particularly useful in the greeting card industry as a means for providing for light reflection and blinking lights coming from the apparatus affixed to the undersurface of the greeting card and viewed by a viewer through perforations in the greeting card's surface.

Generally, the invention is comprised of reflecting light at a specific location within the interior or core of a fiber optic to the outside of the fiber optic, such that a viewer on the outside will see concentrated light at the reflection location within the fiber optic. The blinking of this light is caused by the recurrent transmission of light into the interior of the fiber optic. The reflection is localized by making incisions in the body of the fiber optic at the specified locations.

Presently, the use of fiber optic apparatus is known and used in industry. These apparatus were designed and operated as follows: In order to create more than one blinking light, separate lengths of fiber optics have been necessary. For each separate blinking light location, it was necessary to have separate lengths of fiber optics. Thus, for a viewer to see "n" blinking lights, "n" fiber optics were required, where "n" is an integer greater than zero. Each length of fiber optic also has been used with a separate light source for illumination for each length. Thus "n" fiber optic length has required "n" light sources, where "n" is an integer greater than zero.

By the use of numerous light sources, a greater demand for energy use was placed on the energy source by these light sources. If an apparatus used only one energy source to provide all of the energy to illuminate numerous light sources, the energy source depleted more rapidly than if for example only one light source needed to be illuminated. This exhaustion of energy reduced the useful life of a blinking apparatus, that is, the time when the energy source would have to be replenished, e.g., by replacing a battery. Should more than one energy source be used in a blinking apparatus, there were then more parts necessary, which used more space and cost more money.

Common designs, layouts and operations previously used can be shown by example. A sign with "n" blinking lights where "n" is an integer greater than zero, required "n" appropriately sized and spaced separate fiber optic lengths. A localized blinking light effect could only be created and seen at the terminal end of each fiber optic. So careful placement of each of "n" terminal ends of the fiber optics was required. This presented cumbersome design and spacing problems in the small space available in a greeting card. Each of the separate fiber optic lengths was then illuminated by a light source. The blinking effect was created by the periodic activation and deactivation of this light source by any commonly used circuitry and electric current regulator.

The invention comprises a light reflection and blinking apparatus requiring only one fiber optic length, one light source and one power source to provide many separate blinking lights. This apparatus provides a blinking light apparatus which has a minimum of parts to produce an equivalent or greater number of blinking lights than was previously available. This apparatus is less costly and cumbersome and more easy to design because of fewer component parts and a reduced energy demand on the energy source. In effect, an improved and more useful blinking light apparatus has been invented.

SUMMARY OF THE INVENTION

The method and apparatus disclosed herein generally comprises a light reflection and blinking light apparatus having a light source or emitter, a means for regulating the transmission of light from the light emitter, and a length of fiber optic in communication with the light emitter having a means for light reflection.

In the preferred embodiment the fiber optic is comprised of repeated appropriately spaced incisions or reflection locations in the fiber optic. These incisions cause the reflection of light which has been transmitted into the length of the fiber optic. Each incision in turn transmits the light from within the fiber optic to the outside. By providing for the recurrent transmission of light through the fiber optic a blinking effect can be seen at any incision location in the fiber optic when viewing it from outside of the fiber optic. These incisions can be made at any desired location in the fiber optic to enable the reflection of light at these locations along the length of the fiber optic. By controlling the number of transmissions of light into the fiber optic in a designated time interval, essentially by the activation and deactivation of the light emitter, a blinking effect can be created.

It is the object of this invention to provide a method and apparatus for light reflection and blinking using a fiber optic having a light emitter, a means for regulating the transmission of light from the light emitter, and a means for reflecting the transmitted light outside the fiber optic at a specified location of the fiber optic.

Furthermore, it is an object to provide a greeting card apparatus enclosing a light reflection and blinking apparatus to provide for a blinking light effect within the body of the greeting card.

Furthermore, it is an object of the invention to provide an apparatus which is comprised of "n" blinking lights in the body of the fiber optic, but has "k" fiber optics where k=n when n=1, and "k" is less than or equal to "n" when "n" is an integer greater than one.

The manner, methods and apparatus in which these and other objects of the invention can be attained appear further from the detailed description of the preferred embodiment and other embodiments which follows and the accompanying drawings.

BRIEF DESCRIPTION OF THE DRAWINGS

FIG. 5 is a schematic of the blinking control unit for the preferred embodiment comprised of an integrated circuit (IC) known as IC 4049 UB.

FIG. 6 is a transverse or cross-section view of a length of fiber optic showing the angle and depth of the incision within the body of the fiber optic in the preferred embodiment.

FIG. 7 is a transverse view of the fiber optic along line 7 in FIG. 6 viewing into the incision within the fiber optic of FIG. 6.

FIG. 8 illustrates the dimensions and shape of an incision wedge removed from the body of the fiber optic.

DETAILED DESCRIPTION OF THE INVENTION

Fiber optics of many dimensions, grades and qualities exist presently. They are generally described in the art as transparent dielectric fibers. A propagation of light throughout the fiber optic follows familiar laws of geometrical optics as long as the diameter of these fibers is large compared to the wave length of the radiant light energy. See Hecht, E. and Zajac, A., OPTICS, Addison-Wesley Publishing Co., 1974, page 135. Fiber optics are available in a wide range of diameters today commercially ranging from about two microns up to about one-quarter of an inch in diameter, but seldom do these diameters range in size much less than about ten microns, which is equal to 0.01 millimeters (mm). Id.

It is believed that the invention can be practiced by any fiber optic that allows for light reflection from within the fiber optic to the outside when prepared in accordance with the invention. In the preferred embodiment, the fiber optic which is used is ESKA, a brand name and product of Mitsubishi Rayon Company. This fiber is made of a core of high-purity polymethylacrylate and has a thin clad of transparent fluorine polymer. It is 1.0 millimeters (mm) in diameter and is classified by the manufacturer as a JK-40 grade.

Figure 1:
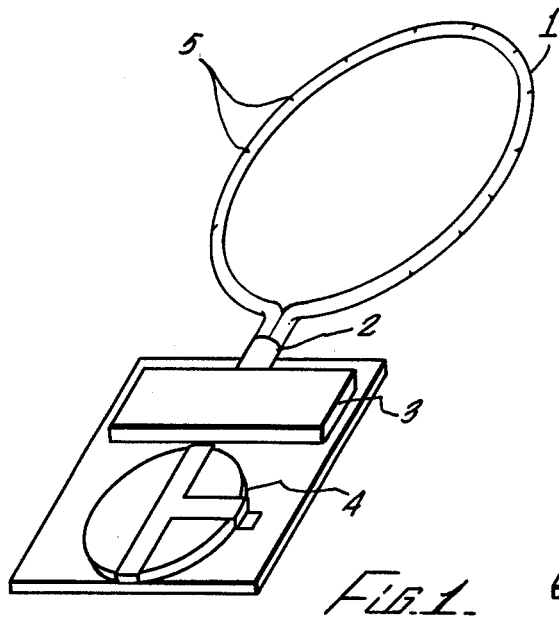
FIG. 1 is a schematic illustrating the general form and relationship of the preferred embodiment of the light reflection and blinking light apparatus according to the invention, having one fiber optic length, one light source, one blinking control unit and one power source.

In the preferred embodiment, one length of fiber optic is all that is required to produce many different blinking locations. In FIG. 1, one form of the preferred embodiment of the apparatus can be seen. The length of fiber optic 1 formed in a circle connects at both ends to a light emitter 2 which is a light emitting diode, or L.E.D., which in turn is controlled by a blinking control unit 3. The entire system is powered by the power source, which can be a battery 4. Around the fiber optic spaced approximately equi-distance, one from the other, are a series of incisions 5.

Figure 2:
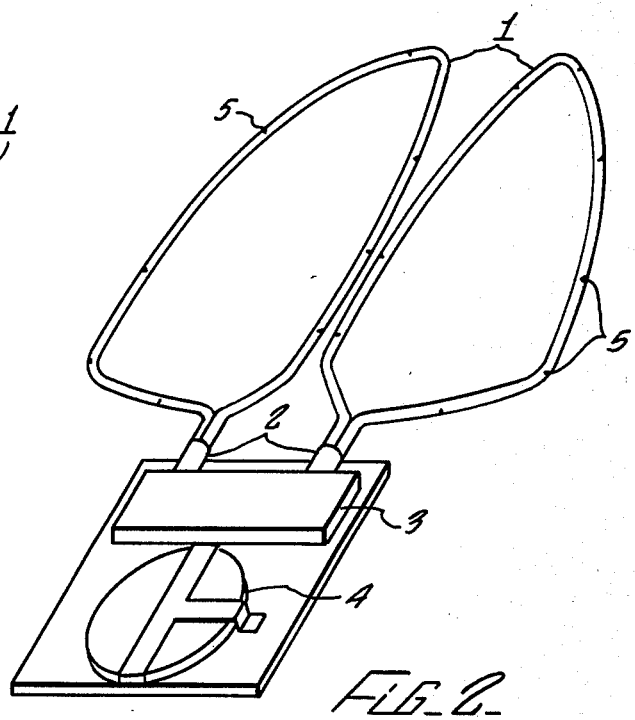
FIG. 2 illustrates a light reflection and blinking light apparatus having two lengths of fiber optics, two light sources, a blinking control unit and one power source.
Figure 3:
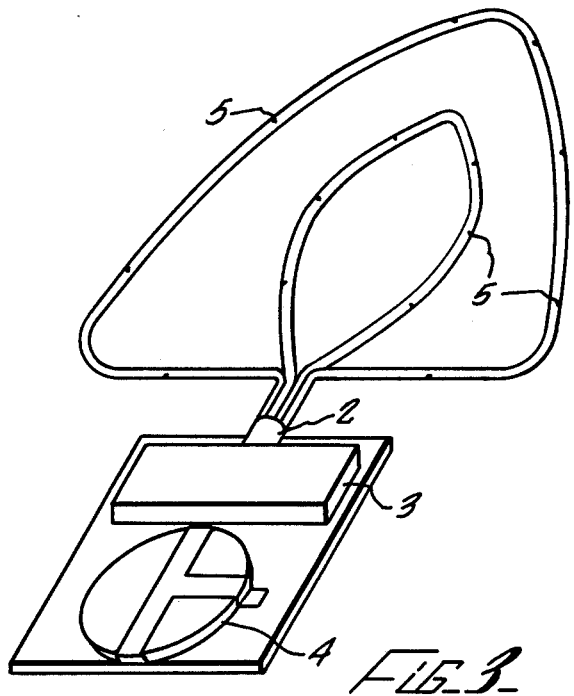
FIG. 3 illustrates a light reflection and blinking light apparatus having two lengths of fiber optics, one light source, a blinking control unit and one power source.
Figure 4:
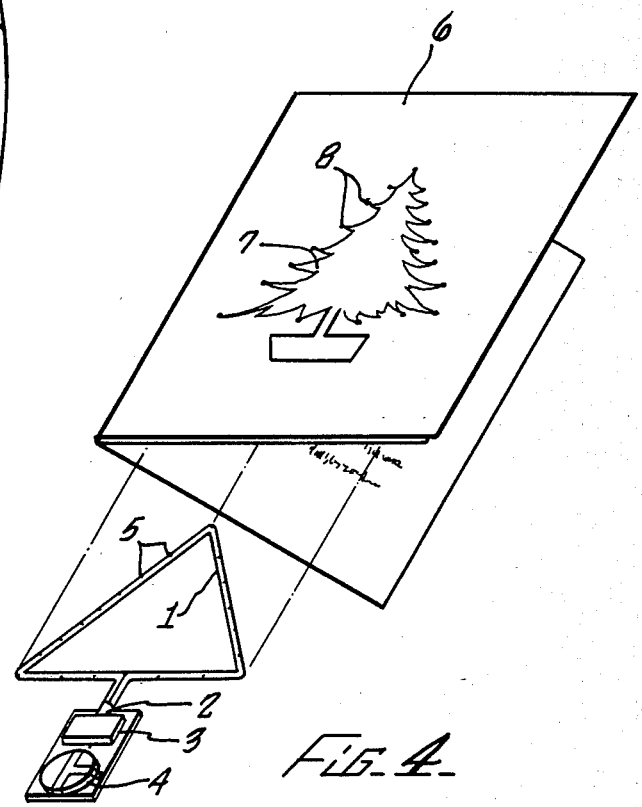
FIG. 4 is an exploded illustration of the preferred embodiment of a greeting card containing the light reflecting and blinking light apparatus showing the precise alignment of the perforations in the front face of the greeting card with the incision locations in the length of fiber optic.

FIGS. 2 and 3 show combinations of these units having more than one fiber optic 1, or light emitter 2. FIG. 4 illustrates the use of this apparatus in the interior of a greeting card. The greeting card 6 has the illustration of a Christmas tree or pine tree 7 on the exterior of the card. Around this pine tree illustration are appropriately spaced perforations 8. These perforations are spaced accordingly, to provide precise alignment with the incisions 5 in the length of the fiber optic 1. This alignment provides that the light reflected from within the length of fiber optic at the incisions, passes through the perforations in the exterior of the greeting card and can then be visible to a viewer of the card. The whole apparatus is fixed in place in the interior of the greeting card.

The light emitter 2 is firmly in communication with either or both lengths of each fiber optic 1. Upon activation by the blinking control unit 3, drawing upon the power source 4, the light emitter transmits light into the fiber optic. As the light travels through the length of the fiber optic it will encounter the incisions in the fiber optic. Each incision 5 in the length of fiber optic is designed to provide a concentrated, high magnitude optical reflection and blinking effect at the incision location in the length of each fiber optic. These incisions cause the reflection of light to the exterior of the fiber optic throughout the length of the fiber optic. When light encounters each incision, some of it will be reflected to the exterior of the fiber optic.

FIGS. 1, 2, and 3 illustrate a variety of inventive arrangements of the apparatus. Both ends of the fiber optic are shown attached to a single light emitter. This manner of attachment of both ends is not required but is useful in some applications. By attaching the diode to both ends of the length of fiber optic, light can be simultaneously transmitted in both directions around the length of the fiber optic.

The blinking effect itself is generated by causing the recurrent or periodic transmission of light from the light emitter 2 into the length of the fiber optic 1. Connected to the light emitter is any regulating means comprised of a blinking control unit 3 and a power source 4. The blinking control unit can be any integrated circuit or any mechanism appropriate for causing the recurrent transmission of light by the light emitter powered by any appropriate power supply, preferably portable, such as a battery cell or its equivalent. The regulating means is connected directly to the light emitter. FIG. 5 illustrates a schematic circuitry lay-out for the blinking control unit, an I.C. 4049 UB for two lengths of fiber optics connected to the unit.

The entire apparatus can be activated by any "on-off" mechanism type in direct contact with the regulating means. When the switch is in the "on" position, power is recurrently available to the light emitter through the blinking control unit controlling the periodicity of light transmission. This results in the periodic or recurrent transmission of light from the light emitter into the fiber optic length. By setting up the regulating means in appropriate fashion, light can be transmitted more or less frequently as the electrical flow to the light emitter is regulated. Thus a more or less frequent blinking effect will be seen at each incision location. Should no blinking effect be sought, but only a constant reflection at the incisions, then the simple and continuous transmission of light into the length of fiber optic is all that is necessary.

The incisions themselves can be any cut in or wedging out of portions of the fiber optic. It has been found that incisions of varying depths and angles provide a means for light reflection.

The incision in the length of fiber optic is well illustrated by reference to FIGS. 6, 7, and 8. The fiber optic itself 9 is a three dimensional solid in the shape of a cylindrical solid. For purposes of geometric portions of this description, it is sometimes referred to as a "cylinder". The cylinder has a longitudinal axis 10 running through its entire length. This longitudinal axis 10 is an imaginary line comprising all of the center points of all imaginary circular cross-sections 11 of the cylinder. Each cross-section 11 is circular and has a diameter or transverse axis 12 which intersects the longitudinal axis at the imaginary center point 13 of the circular cross-section and which is perpendicular to the longitudinal axis. The cylinder has a diameter A, and a radius B. The depth of an incision made in the cylinder is C.

In the preferred embodiment the incision is a wedge removed from the body of the cylinder. This wedge is bounded by a chord 17 which is transverse to the cylinder and parallel to the transverse axis 12. Further bounding this wedge are two segments of intersecting planes 18 and 19. These plane segments 18 and 19 intersect each other at all points within the cylinder along the chord 17. The chord 17 is a chord connecting two points of the transverse arc 20, which is a portion of the circular cross-section 11. This transverse arc 20 subtends the chord 17. The two plane segments 18 and 19 are symmetric about the chord 17 and intersect each other at all points within the cylinder at an angle D.

Once the location of the incision has been determined, for example by its application in the interior of a greeting card, the cylinder is positioned by reference to the viewpoint of the viewer of the reflected light. In FIG. 6 the eye 15 is the location of the eye of the viewer in the preferred embodiment application. Eye 15 is located on the opposite side of the cylinder from the incision, illustrated by the line of vision 16 running from eye 14 to eye 15, said line of vision further perpendicular to both its intersection of the chord 17 and the longitudinal axis 10. It is preferred that the viewer be located at about the location of eye 15 relative to the incision. This provides for viewing the light reflection at a superior magnitude and concentration.

To prepare any incision any appropriately precise cutting and measuring tool can be used. In the preferred embodiment the ESKA fiber optic is used. It has a diameter A of one millimeter, and a radius B of 0.5 millimeter. The depth of the incision C equals 0.3 millimeters. The angle of intersection D between the two plane segments 18 and 19 equals 30 degrees. The line of vision 16 is perpendicular to both the chord 17 and the longitudinal axis 10.

Other fiber optics which allow for the reflection of light to the outside of the fiber optic, and of any diameter can be used. The depth of incision C and the angle of intersection D can be varied extensively. These variations of depth C and angulation D ordinarily will effect the quantity and intensity of light seen from any viewpoint. The depth C of 0.3 millimeters and angulation D of 30 degrees have been found to be most effective in providing a concentrated high magnitude optical effect as viewed along line of vision 16 from the opposite side of the incision. However, it is not necessary that the viewer be placed on the opposite side of the fiber optic from the incision, as light reflections can be seen from many positions relative to the fiber optic incision.

The preferred embodiment of a greeting card using the blinking light apparatus, as generally illustrated by FIG. 4, can be set up and operated as follows. The apparatus is fixed in position in the interior of the card in a design as illustrated by FIG. 4. The perforations 8 should be placed on the opposite side of each of the fiber optic incisions 5. The provision of an "on-off" switch into the blinking light apparatus can be provided by any mechanism known in the art. The battery 4 can be any appropriately small sized battery. When the card is closed concealing the apparatus, the "on" switch activates the blinking light appatatus causing power from the power source 4 to reach the blinking control unit 3 causing the recurrent transmission of electrical energy to the light emitting diode 2, which in turn intermittently transmits light into the length of the fiber optic 1. As the light travels through the fiber optic and encounters each incision 5, light will be reflected to the exterior of the fiber optic, passing through the perforations 8, providing any viewer with the view of blinking lights at the branches of the illustrated pine tree 7.

The invention provides for many blinking lights at many locations in the body of only one fiber optic, and requiring only one light source, or light emitter. If the application of the user required "n" blinking lights, where "n" is an integer greater than one, than "n" incisions are made in the length of the fiber optic. These "n" blinking lights can be provided by the use of only "k" fiber optics. Thus "k" fiber optics are required, where k=n when n=1, and where "k" is less than or equal to "n" when "n" is an integer greater than one. Furthermore, "n" blinking lights can be provided by making "n" incisions in the body of one or more fiber optics, while only "k" light emitters or light sources are required. Thus "k" light emitters are required where k=n when n=1, and where "k" is less than or equal to "n", when "n" is an integer greater than one.

The above examples are in no way a limitation on the scope of this invention but rather illustrates some applications in the use of this invention.

Althought the present invention has been described in considerable detail with reference to certain preferred versions thereof, other versions are possible. Therefore, the spirit and scope of the appended claims should not necessarily be limited to the description of the preferred versions contained herein.

I claim:

1. A greeting card having a perforation and enclosing a blinking light apparatus, said apparatus comprising a light emitter, a length of fiber optic in communication with the emitter, and a blinking control unit regulating the transmission of light from the emitter and the fiber optic, said fiber optic having an incision in alignment with the perforation, said incision further transmitting light from within the fiber optic through the perforation providing a viewer with the view of a blinking light at the perforation by a concentrated high magnitude optical effect at the incision.

* * * * *